(12) United States Patent
Xiao et al.

(10) Patent No.: US 11,457,287 B2
(45) Date of Patent: Sep. 27, 2022

(54) METHOD AND SYSTEM FOR PROCESSING VIDEO

(71) Applicant: Realtek Semiconductor Corporation, Hsinchu (TW)

(72) Inventors: Zhong-Fa Xiao, Hunan (CN); Chun-Yi Chen, Hsinchu (TW); Le-Qian Zhou, Hunan (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 150 days.

(21) Appl. No.: 16/674,123

(22) Filed: Nov. 5, 2019

(65) Prior Publication Data
US 2020/0296477 A1    Sep. 17, 2020

(30) Foreign Application Priority Data
Mar. 15, 2019   (CN) ......................... 201910198975.2

(51) Int. Cl.
*H04N 21/6587* (2011.01)
*H04N 21/858* (2011.01)
*H04N 21/647* (2011.01)
*H04N 21/432* (2011.01)
*H04N 21/845* (2011.01)

(52) U.S. Cl.
CPC ..... *H04N 21/6587* (2013.01); *H04N 21/4325* (2013.01); *H04N 21/64738* (2013.01); *H04N 21/8456* (2013.01); *H04N 21/858* (2013.01)

(58) Field of Classification Search
CPC ......... H04N 21/8456; H04N 21/23439; H04N 21/26258; H04N 21/234309; H04N 21/2402; H04N 21/44209; H04N 21/8586
See application file for complete search history.

(56) References Cited

U.S. PATENT DOCUMENTS

| | | | |
|---|---|---|---|
| 2008/0069514 A1* | 3/2008 | Son ......................... | H04N 5/775 386/291 |
| 2012/0311094 A1* | 12/2012 | Biderman .......... | H04N 21/8456 709/219 |
| 2013/0290493 A1* | 10/2013 | Oyman ................ | H04B 7/0639 709/219 |
| 2015/0067722 A1* | 3/2015 | Bjordammen ..... | G06Q 30/0253 725/32 |

(Continued)

FOREIGN PATENT DOCUMENTS

| CN | 102204272 A | 9/2011 |
|---|---|---|
| CN | 106803999 A | 6/2017 |

*Primary Examiner* — Jason Salce
(74) *Attorney, Agent, or Firm* — Locke Lord LLP; Tim Tingkang Xia, Esq.

(57) ABSTRACT

A video processing method includes following operations: receiving a seek command, and determining whether a stored data stream includes first data corresponding to a first segment of a video; if the stored data stream does not include the first data, acquiring a download link of the first segment; generating an estimated network speed value according to at least one network speed value prior to receiving the seek command, and downloading the first data from a server according to the estimated network speed value and the download link, in which the estimated network speed value is less than the at least one network speed value; and playing the first segment according to the first data to switch from a current segment of the video to the first segment.

15 Claims, 5 Drawing Sheets

(56) References Cited

U.S. PATENT DOCUMENTS

| | | | | |
|---|---|---|---|---|
| 2015/0082349 A1* | 3/2015 | Ishtiaq | ............... | H04N 21/4884 |
| | | | | 725/40 |
| 2015/0085875 A1* | 3/2015 | Phillips | ............. | H04N 21/2402 |
| | | | | 370/465 |
| 2015/0256581 A1* | 9/2015 | Kolhi | ................ | H04N 21/4126 |
| | | | | 709/219 |
| 2016/0006817 A1* | 1/2016 | Mitic | ...................... | H04L 65/80 |
| | | | | 709/232 |
| 2016/0182594 A1* | 6/2016 | White | .................. | H04L 65/607 |
| | | | | 709/219 |
| 2016/0323653 A1* | 11/2016 | Chen | .................. | H04N 21/6587 |
| 2016/0337426 A1* | 11/2016 | Shribman | ............. | H04L 65/608 |
| 2017/0374116 A1* | 12/2017 | Phillips | ................. | H04W 4/029 |
| 2018/0176615 A1* | 6/2018 | Hannu | .................... | H04L 69/08 |
| 2018/0343291 A1* | 11/2018 | Lohmar | ................. | H04L 65/605 |
| 2019/0028743 A1* | 1/2019 | He | .................. | H04N 21/25825 |

* cited by examiner

METHOD AND SYSTEM FOR PROCESSING VIDEO

RELATED APPLICATIONS

This application claims priority to Chinese Application Serial Number 201910198975.2 filed Mar. 15, 2019, which is herein incorporated by reference.

BACKGROUND

Technical Field

The present disclosure relates to a video processing method and a video processing system. More particularly, the present disclosure relates to a video processing method and a video processing system applied to HyperText Transfer Protocol (HTTP).

Description of Related Art

With developments in the network technology and the video processing technology, playing a video or an audio on the network is very common. In practical applications, a viewer needs to switch a video from a current segment to a forward segment or a backward segment to see the content at a different timing. However, the operations of seeking the video in the prior art are not optimized to make the video be played fluently.

SUMMARY

One embodiment of the present disclosure is related to a video processing method. The video processing method includes following operations: receiving a seek command, and determining whether a stored data stream includes first data corresponding to a first segment of a video; if the data stored stream does not include the first data, acquiring a download link of the first segment; generating an estimated network speed value according to at least one network speed value prior to receiving the seek command, and downloading the first data from a server according to the estimated network speed value and the download link, in which the estimated network speed value is less than the at least one network speed value; and playing the first segment according to the first data to switch from a current segment of the video to the first segment.

One embodiment of the present disclosure is related to a video processing system. The video processing system includes at least one memory and at least one processor. The at least one memory is configured to store a source code and a data stream. The at least one processor configured to execute the source code to: receive a seek command, and determine whether the data stream includes first data corresponding to a first segment of a video; if the data stream does not include the first data, acquire a download link of the first segment; generate an estimated network speed value according to at least one network speed value prior to receiving the seek command to download the first data from a server according to the estimated network speed value and the download link, in which a bit rate of the first data is less than the estimated network speed value; and play the first segment according to the first data to switch from a current segment of the video to the first segment.

As the above embodiments, the video processing system and the video processing method of the present disclosure can enhance playing efficiency and seeking efficiency of the video, and enhance fluency of the video.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

As used herein with respect to the "first", "second" . . . is not special order or pick the alleged meaning, but simply to distinguish the operation described in the same terms or elements of it. As used herein with respect to the "and/or" includes one or a combination of the listed items.

In the present disclosure, "connected" or "coupled" may refer to "electrically connected" or "electrically coupled." "Connected" or "coupled" may also refer to operations or actions between two or more elements.

Figure 1:
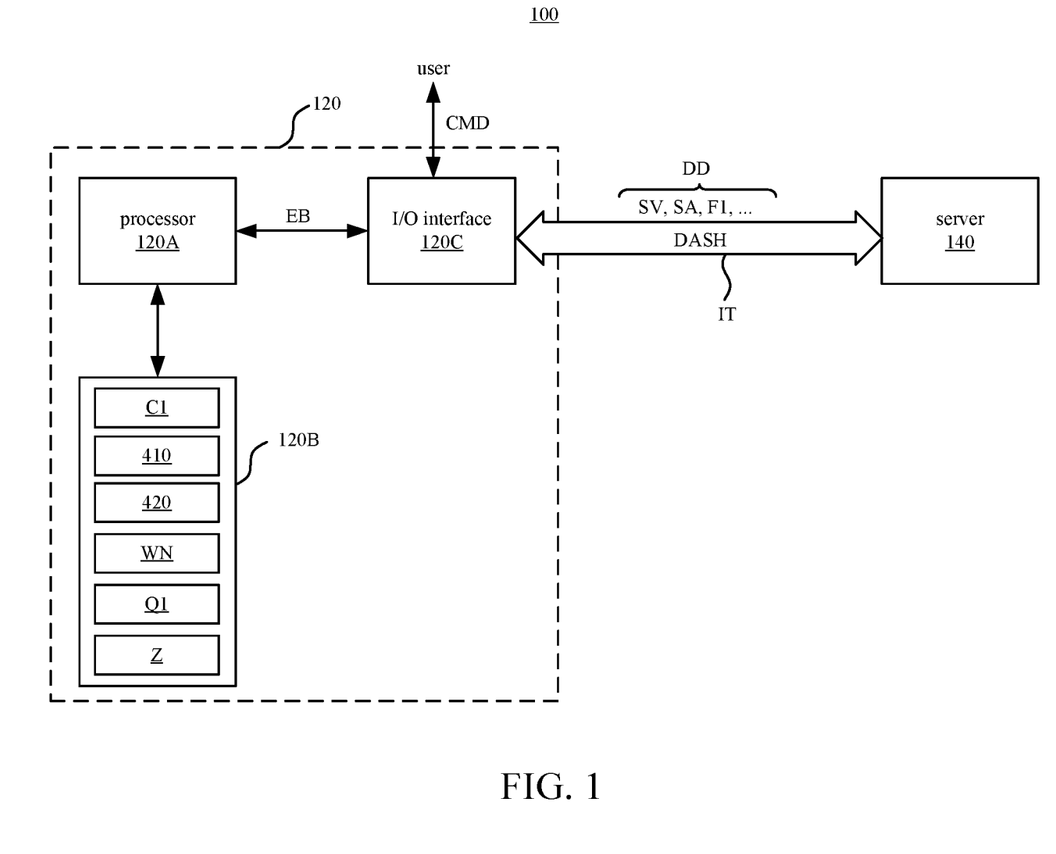
FIG. 1 is a schematic diagram illustrating a video processing system according to some embodiments of the present disclosure.

Reference is made to FIG. 1. FIG. 1 is a schematic diagram illustrating a video processing system 100 according to some embodiments of the present disclosure.

The video processing system 100 includes a client end 120 and a server end 140. The client end 120 sends a request to the server end 140 through the network IT to acquire a video DD (including video information SV and audio information SA). In some embodiments, the network IT may be a wired network or a wireless network, and supports HyperText Transfer Protocol (HTTP). In some embodiments, the server end 140 may transmit the video DD through dynamic adaptive streaming over HTTP (DASH).

In some embodiments, the client end 120 may play the video DD by executing a method 200 (a video processing method 200) described in following paragraphs. In some embodiments, the client end 120 may speed up operation efficiency of seeking the video by executing a method 600 (a video seeking method 600) described in following paragraphs. In some embodiments, the client end 120 may be any electrical device. The electrical device is, for example, a cell phone, a tablet, a personal computer, and so on.

In some embodiments, the client end 120 includes at least one processor 120A, at least one memory 120B, and an input/output (I/O) interface 120C. The at least one processor 120A may be implemented by at least one digital signal processing circuit, CPU, ASIC, multi-core processor, distributed system, or suitable processing circuit. Various circuits or units configured to implement the at least one processor 120A are within the contemplated scope of the present disclosure.

The at least one memory 120B stores at least one source code C1 configured to process the video DD. The at least one processor 120A may execute the at least one source code C1 stored in the at least one memory 120B, to automatically execute operations of acquiring the video DD from the server end 140 and playing the video DD. For example, the at least one source code C1 may be applied to an instruction set architecture of operations in FIG. 2 or 5. In some embodiments, the at least one memory 120B also stores a data stream 410, a data stream 420, weights WN, a predetermined parameter Q1, and/or a predetermined multiple Z.

In some embodiments, the at least one memory 120B may be a non-transitory computer readable storage medium. The non-transitory computer readable storage medium is, for example, a RAM, a ROM, a hard disk, and/or an optical disk, but the present disclosure is not limited thereto.

The I/O interface 120C may receive inputs or commands (for example, a seeking command CMD) from various control devices (not shown), in which the control devices may be operated by a user. Accordingly, the video processing system 100 may be controlled by the inputs or the commands received through the I/O interface 120C. In some embodiments, the I/O interface 120C includes a display device which is configured to display the video DD. In various embodiments, the I/O interface 120C includes a GUI, a keyboard, a mouse, a trackball, a trackpad, a touch screen, a cursor arrow key, or any combination of these elements, to communicate with the at least one processor 120A, e.g., exchanging information and commands. In some embodiments, the I/O interface 120C includes a communication circuit (for example, a network card, a signal transceiver etc.), to establish a connection of the network IT between the I/O interface 120C and the server end 140.

The numbers of the at least one processor 120A, the at least one memory 120B, and the I/O interface 120C in FIG. 1 respectively are given for illustrative purposes only, but the present disclosure is not limited thereto. In various embodiments, the numbers of the at least one processor 120A, the at least one memory 120B, or the I/O interface 120C respectively may be one or more than one.

Figure 2:
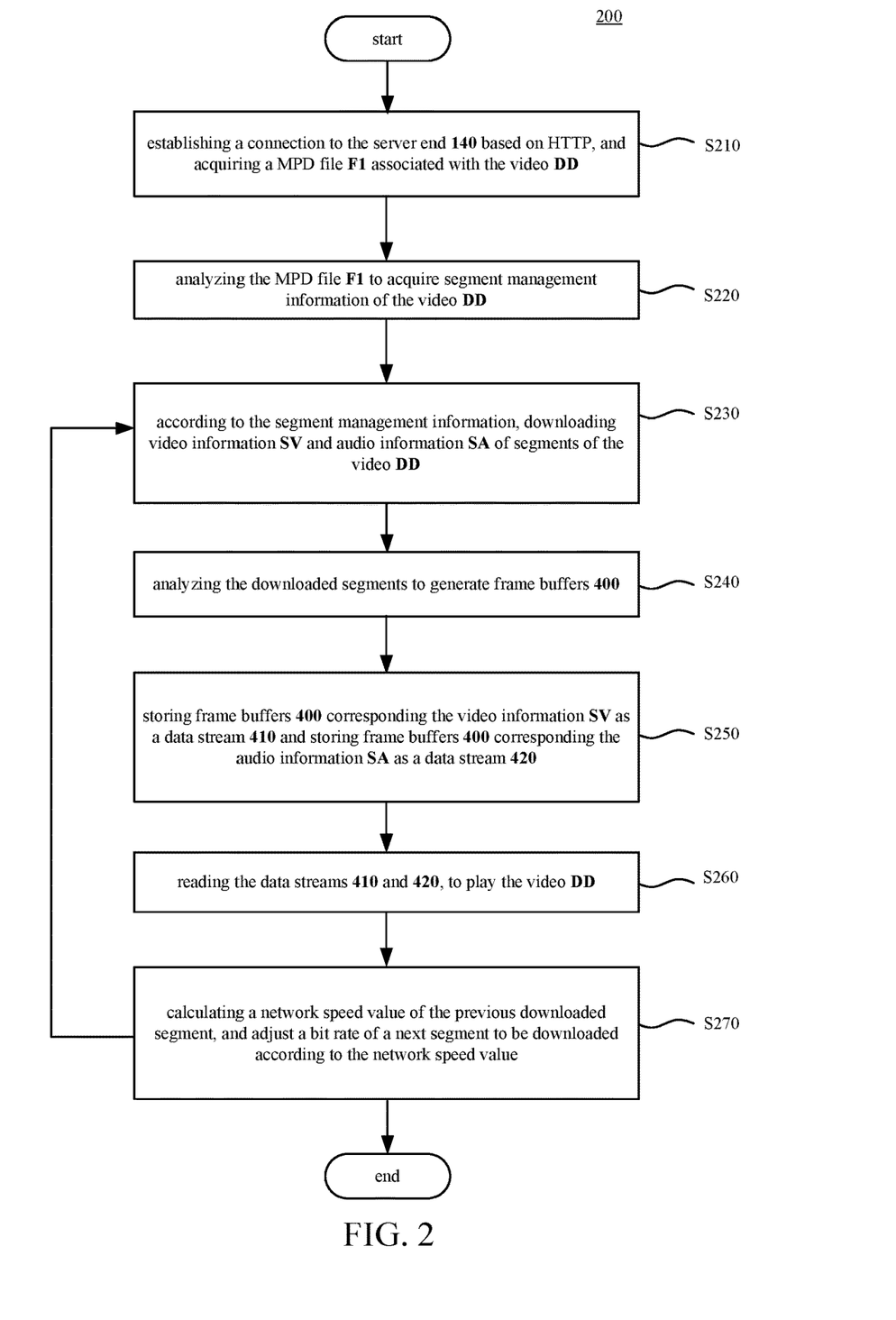
FIG. 2 is a flow diagram illustrating a video processing method according to some embodiments of the present disclosure.

Reference is made to FIG. 2. FIG. 2 is a flow diagram illustrating the video processing method 200 according to some embodiments of the present disclosure. In some embodiments, the video processing method 200 is executed by the at least one processor 120A.

In operation S210, a connection to the server end 140 is established based on HTTP, and a media presentation description (MPD) file F1 associated with the video DD is acquired.

In operation S220, the MPD file F1 is analyzed to acquire segment management information, e.g., time information, of the video DD.

In operation S230, the video information SV and the audio information SA of segments of the video DD are downloaded according to the segment management information.

For example, the client end 120 may send a connection request to the server end 140, to establish the network IT based on HTTP. The client end 120 sends a request (not shown) of playing the video DD to the server end 140 through the network IT. The server end 140 may send the MPD file F1 to the client end 120 in response to the request. The client end 120 may analyze the MPD file F1, to acquire the segment management information of the video DD.

Figure 3:
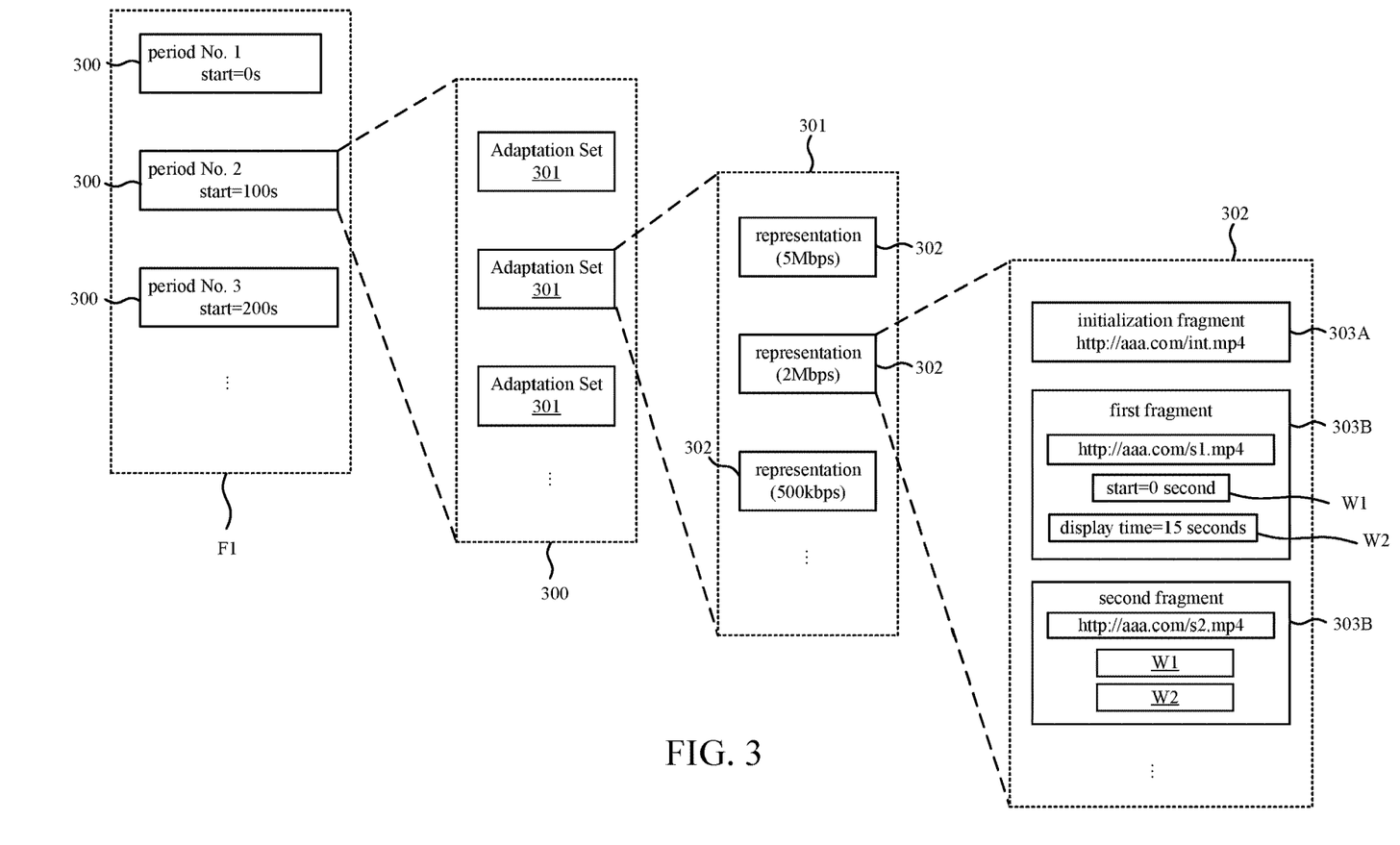
FIG. 3 is a schematic diagram illustrating structures of a MPD file in FIG. 1 according to some embodiments of the present disclosure.

Reference is made to FIG. 3. FIG. 3 is a schematic diagram illustrating structures of the MPD file F1 in FIG. 1 according to some embodiments of the present disclosure. For example, the at least one processor 120A may execute a compiler or software (not shown) stored in the at least one memory 120B, to analyze the MPD file F1. In some embodiments, the MPD file F1 has a tree structure shown in FIG. 3.

As illustrated in FIG. 3, periods 300 include one or more Adaptation Sets 301. Each of the Adaptation Sets 301 may include plans (representations 302) of videos (and/or audios) with various bit rates. Each of the representations 302 includes initialization data 303A and media segment data 303B.

The media segment data 303B includes a download link (URL) and information W1 or W2 of a corresponding segment of the video DD. According to DASH technology, a mechanism of segment management may include a "SegmentBase" mechanism or a "SegmentTemplate" mechanism. In the "SegmentBase" mechanism, the media segment data 303B includes the information W1. The information W1 indicates starting time of a corresponding segment of the video DD. In the "SegmentTemplate" mechanism, the media segment data 303B includes the information W2. The information W2 indicates a total play time of a corresponding segment of the video DD.

Accordingly, the client end 120 may download the video information SV and the audio information SA corresponding to each of the segments according to the information mentioned above. In some embodiments, when a first segment is being downloaded, because a current network speed is unknown, the client end 120 may download the video information SV and the audio information SA corresponding to a middle bit rate.

Reference is made to FIG. 2 again. In operation S240, the downloaded segment is analyzed, to generate frame buffers 400.

In operation S250, the frame buffers 400 corresponding to the video information SV are stored as the data stream 410, and the frame buffers 400 corresponding to the audio information SA are stored as the data stream 420.

Figure 4:
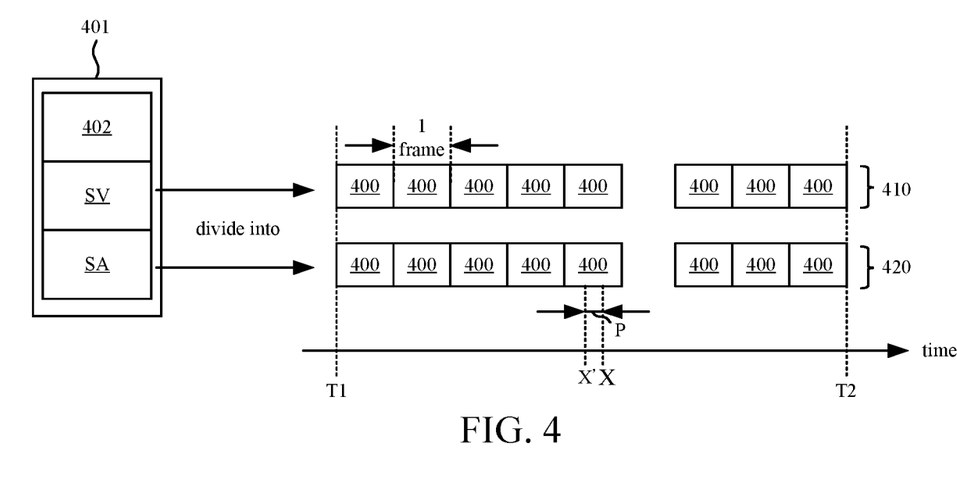
FIG. 4 is a schematic diagram illustrating frame buffers according to some embodiments of the present disclosure.

Reference is made to FIG. 4. FIG. 4 is a schematic diagram illustrating the frame buffers 400 according to some embodiments of the present disclosure. As illustrated in FIG. 4, the at least one processor 120A may read a header 402 of a first segment 401 after the first segment 401 of the video DD is downloaded. The header 402 may include information of a frame number, a size of each of the frames, time and a key frame. Then, the at least one processor 120A may cut the first segment 401 to be multiple frames according to the information mentioned above and store content and relevant information of each of the frames as one of the frame buffers 400.

As illustrated in FIG. 4, the at least one processor 120A may generate the frame buffers 400 corresponding to the video information SV and store these frame buffers 400 as the data stream 410. The at least one processor 120A may generate the frame buffers 400 corresponding to the audio information SA and store these frame buffers 400 as the data stream 420. In some embodiments, the data streams 410 and 420 may be stored in the at least one memory 120B in FIG. 1. In some embodiments, the data stream 410 is independent from the data stream 420.

The first segment 401 is taken as an example in FIG. 4, but the present disclosure is not limited thereto. In various embodiments, the at least one processor 120A would analyze each of downloaded segments of the video DD, to generate multiple data streams 401 and 420 corresponding to different segments respectively.

Reference is made to FIG. 2 again. In operation S260, the data stream 410 and the data stream 420 are read to play the video DD. For example, the at least one processor 120A may read data in the data streams 410 and 420 from the at least one memory 120B a frame by a frame, to perform the following operations of decoding and displaying.

In operation S270, a network speed value of a previous downloaded segment is calculated, and a bit rate of a next segment to be downloaded is adjusted according to the network speed value. After operation S270 is executed, operation S230 is executed again, to download the following segments.

In some embodiments, the at least one processor 120A may evaluate a current network speed based on a result of downloaded data volume divided by total download time. For example, the first segment 401 includes X bytes, and it takes Y seconds to download the first segment 401. The at least one processor 120A may acquire a base value by dividing X by Y. Then, the at least one processor 120A may multiply the base value and the predetermined multiple Z to acquire a network speed value of downloading the first segment 401. According to the network speed value and a practical condition of the current network IT, the at least one processor 120A may choose a suitable bit rate of a second segment. In some embodiments, the predetermined multiple Z may be a value between 2-8 and the present disclosure is not limited thereto.

In some embodiments, when a current segment is going to be downloaded, the at least one processor 120A may choose a bit rate of a segment to be downloaded according to network speed values of some previous segments. For example, when the (N+1)th segment is going to be downloaded, the at least one processor 120A may utilize a formula (1) below to execute a weighted average method to calculate a network speed value BN+1 according to the network speed values BN–BN–4 of the previous five segments.

$$BN+1 = \frac{\sum_{i=0}^{4}[(BN-i) \times (WN-i)]}{\sum_{i=0}^{4} WN-i} \quad \text{formula (1)}$$

WN-i indicates a weight of a (N-i)th segment, a weight WN(i=0, corresponding to a Nth segment) is the greatest, and a weight WN-4(i=4, corresponding to a (N-4)th segment) is the least.

Figure 5:
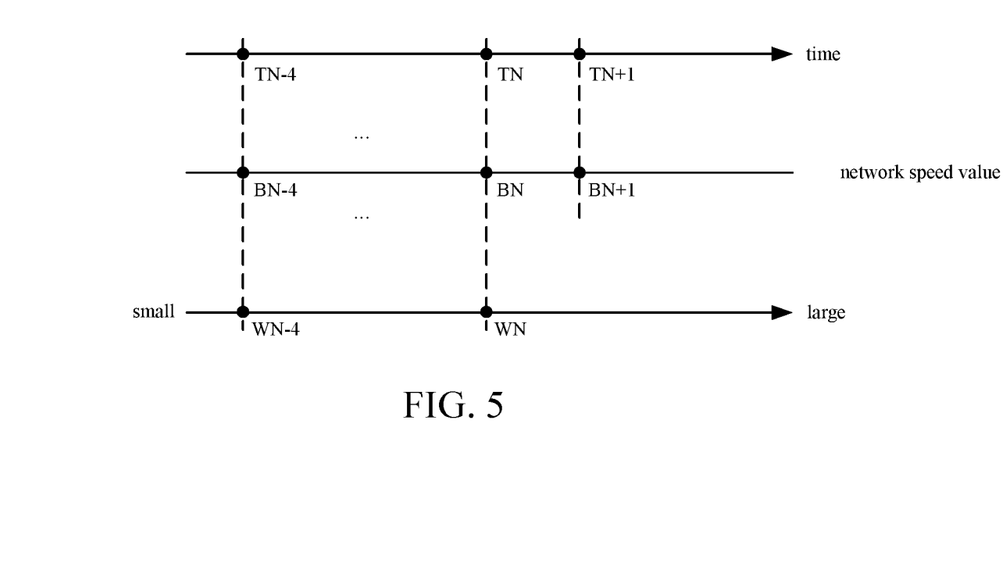
FIG. 5 is a schematic diagram illustrating assigning weights according to some embodiments of the present disclosure.

Reference is made to FIG. 5. FIG. 5 is a schematic diagram illustrating assigning weights WN according to some embodiments of the present disclosure. In other words, in some embodiments, a command (for example, the request of playing the video DD mentioned above or the seek command CMD described below) is sent to the at least one processor 120A at a timing TN+1. Under this condition, if a timing (for example, a timing TN) corresponding to a previous network speed value before the timing TN+1 is closer to the first timing, a weight assigned to the previous network speed value is greater. On the contrary, if the timing (for example, a timing TN–4) corresponding a previous network speed value is farther to the timing TN+1, a weight assigned to the previous network speed value is less.

By the setting method mentioned above, the (N+1)th segment which has a suitable bit rate may be downloaded according to a recent speed change of the network IT. Thus, the video DD could be played fluently and picture quality of the video DD could be ensured.

Figure 6:
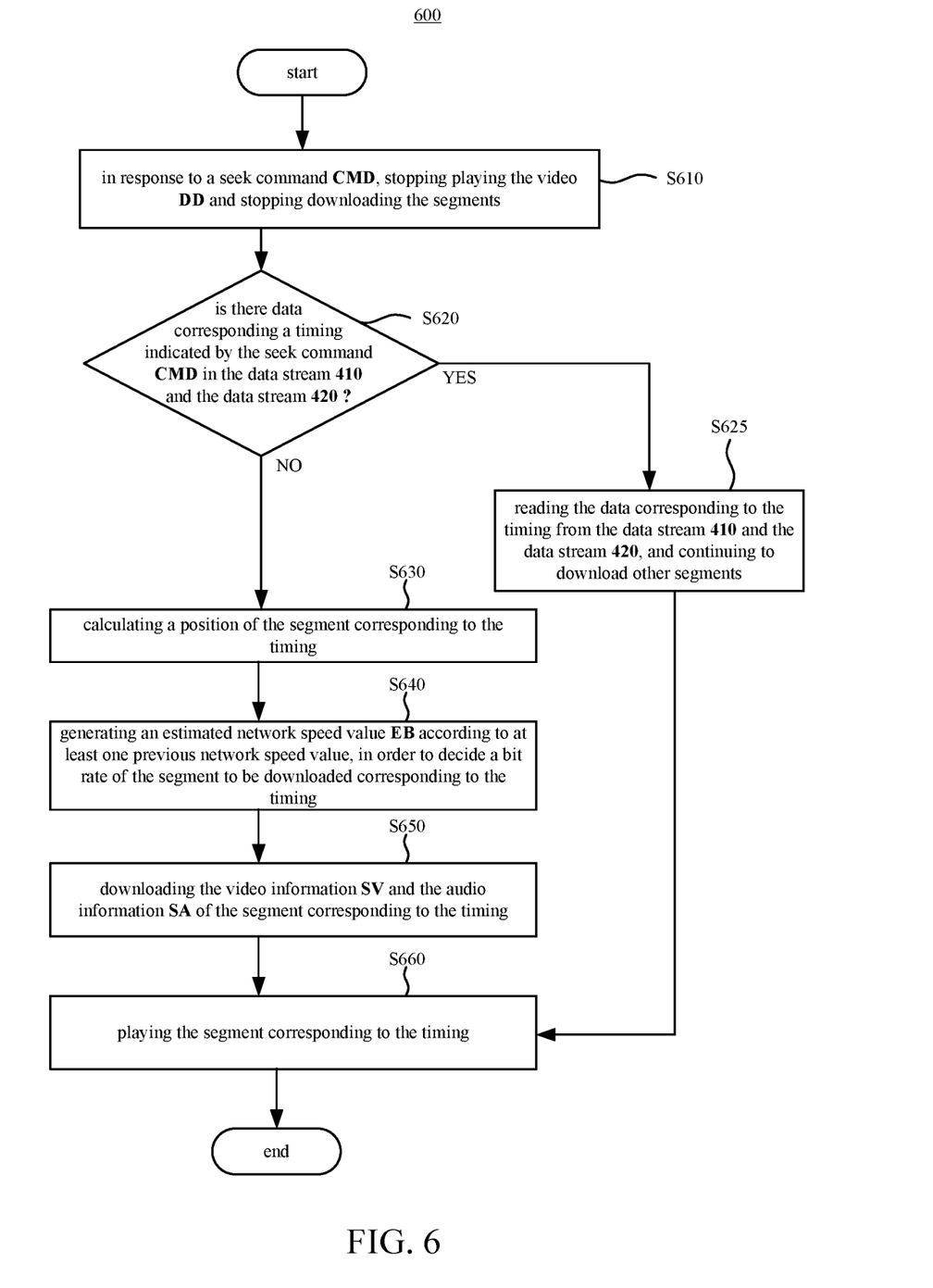
FIG. 6 is a flow diagram illustrating a video seeking method according to some embodiments of the present disclosure.

Reference is made to FIG. 6. FIG. 6 is a flow diagram illustrating the video seeking method 600 according to some embodiments of the present disclosure. In some embodiments, the video seeking method 600 is executed by the at least one processor 120A in FIG. 1.

In operation S610, in response to the seek command CMD, the video DD is temporarily stopped from being displayed and the segments are stopped from being downloaded.

For example, a user may input the seek command CMD through the I/O interface 120C, to seek (seek forward or seek backward) to content at another timing of the video DD. In response to the seek command CMD, the at least one processor 120A may temporarily stop displaying current content of the video DD, and erase temporal content to be decoded and displayed. At the same time, operation (operation S230) of downloading the segments is temporarily stopped to wait for downloading a new segment.

In operation S620, in response to a timing indicated by the seek command CMD, whether there is data corresponding to the timing in the data streams 410 and 420 or not is determined. If the data stream 410 and the data stream 420 include the data corresponding to the timing, operation S625 is executed. On the contrary, if the data stream 410 and the data stream 420 do not include the data corresponding to the timing, operation S630 is executed.

In operation S625, data corresponding to a timing X is read from the data stream 410 and the data stream 420, and operations of downloading other segments are continued.

In operation S660, the segment corresponding to the timing is played.

For example, as illustrated in FIG. 4, each of the data stream 410 and the data stream 420 has a starting time T1 and an ending time T2. When a user would like to seek the timing X of the video DD, the at least one processor 120A may determine whether data corresponding to the timing X exists in the downloaded data stream 410 and the downloaded data stream 420 according to the starting timing T1 and the ending timing T2. If the data corresponding to the timing X exists in the downloaded data stream 410 and the downloaded data stream 420, the at least one processor 120A may read the data to perform operations of decoding and displaying. At the same time, the at least one processor 120A may continue to download other segments.

In some embodiments, if the timing X is a previous timing (seek backward), the corresponding segment is read from the downloaded data stream 410 and the downloaded data stream 420 by operation S620, to efficiently complete the operations of video seeking.

In operation S630, a position of the segment corresponding to the timing is calculated.

If the data corresponding to the timing X does not exist in the downloaded data stream 410 and the downloaded data stream 420, the at least one processor 120A may calculate a position of a new segment (the segment corresponding to the timing X) according to the timing. For example, if the management mechanism is "SegmentBase" mechanism, the at least one processor 120A may compare the timing X and a starting timing in the information W1, to determine the position of the new segment. For example, the timing X is the 5 s (second), a starting timing of a first segment is the 2 s, a starting time of a second segment is the 4.5 s, and a starting time of a third segment is the 7 s. After comparing the timings above, the at least one processor 120A may determine that the timing X is at the second segment.

If the management mechanism is "SegmentTemplate" mechanism, the at least one processor 120A may acquire starting timing of each of the segments according to a total display time of information W2 corresponding to the segments. Then, the at least one processor 120A compares the starting timing of each of the segments and the timing X to determine the position of the new segment. For example, the timing X is the 5 s, the total play time of a first segment is 2 seconds, the total play time of a second segment is 2.5 seconds, and the total play time of a third segment is 2.5 seconds. The at least one processor 120A sums up the total play time of the first segment and the second segment to acquire the starting timing of the third segment which is 4.5 s, and sums up the total play time of the first segment, the second segment, and the third segment to acquire the starting timing of a fourth segment which is the 7 s. The at least one processor 120A compares the starting timing mentioned above and the timing X, to determine that the segment corresponding to the timing X is at the third segment.

In some embodiments, the at least one processor 120A subtracts a predetermined second P (for example, one second, but the present disclosure is not limited thereto) from the seek timing to generate a new seek timing X' (as illustrated in FIG. 4), and utilize this new seek timing X' to execute operation S630. For example, in the example above, the timing X is 5 s, the at least one processor 120A generates the new seek timing X' is 4 s (5−1=4), and utilizes the new seek timing X' to execute operation S630. With this configuration, failure of video seeking due to some conditions can be avoided, and stability of operations of the video seeking can be enhanced.

Reference is made back to FIG. 6. In operation S640, an estimated network speed value EB is generated according to at least one previous network speed value, in order to decide a bit rate of the segment to be downloaded corresponding to this timing.

In operation S650, the video information SV and the audio information SA corresponding to the segment at the timing is downloaded.

In some embodiments, the at least one processor 120A may determine the estimated network speed value EB according to a predetermined parameter Q1 and the network speed values of previous segments, in which the previous segments are downloaded before the seek command CMD is received. The operation herein is similar to the formula (1). For example, the at least one processor 120A determines a network speed value (for example, BN+1) through the formula (1), the estimated network speed value EB may be generated according to a product of this network speed value and the predetermined parameter Q1. The predetermined parameter Q1 may be a positive number less than 1. The positive number less than 1 may be, for example, 0.5, but the present disclosure is not limited thereto.

By setting the predetermined parameter Q1, the estimated network speed value EB is less than the previous network speed value. Thus, the at least one processor 120A may choose and download the video information SV and the audio information SA of the new segment having lower bit rates. Thus, the downloaded data volume could be decreased to speed up a download speed of the new segment, such that the efficiency and play fluency of video seeking are enhanced.

Then, the at least one processor 120A may execute operations which are similar to S230-S250 in FIG. 2 to download the video information SV and the audio information SA corresponding to the new segment and generate a new frame buffer and new data streams. In this operation, the at least one processor 120A may further determine if there is a new data stream corresponding to the seeking timing, to enhance stability of video seeking.

After the new data streams are generated, the at least one processor 120A may read data of the new segment from the new data streams, and perform decoding and displaying (operation S630).

The above description of the method 200 or 600 includes exemplary operations, but the operations of the method 200 or 600 are not necessarily executed in the order described. The operations of the method 200 or 600 could be added, replaced, omitted, or executed by another order, in accordance with the spirit and scope of various embodiments of the present disclosure.

As the above embodiments, the video processing system and the video processing method of the present disclosure can enhance playing efficiency and seeking efficiency of the video, and enhance fluency of playing the video.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A video processing method, comprising:
   receiving a seek command, and determining whether a stored data stream comprises first data corresponding to a first segment of a video or not;
   if the stored data stream does not comprise the first data, acquiring a download link of the first segment;
   executing a weighted average method according to at least one network speed value and at least one weight, to generate a first network speed value corresponding to the first segment, wherein at least one previous segment is downloaded according to the at least one network speed value before the seek command is received;
   multiplying the first network speed value and a predetermined parameter to generate an estimated network speed value;
   selecting a bit rate according to the estimated network speed value;

downloading the first data having the bit rate from a server according to the estimated network speed value and the download link, wherein the estimated network speed value is less than the at least one network speed value, wherein the at least one weight is associated with a first timing when the seek command is sent out; and playing the first segment according to the first data, to switch from a current segment of the video to the first segment.

2. The video processing method of claim 1, wherein determining whether the stored data stream comprises the first data comprises:

comparing a second timing of the first segment, a starting time and an ending time of the stored data stream; and if the second timing exists between the starting time and the ending time, determining that the stored data stream comprises the first data.

3. The video processing method of claim 2, further comprising:

if the stored data stream comprises the first data, reading the first data from the stored data stream to play the first segment.

4. The video processing method of claim 1, wherein the predetermined parameter is a positive number less than 1.

5. The video processing method of claim 1, wherein the seek command is sent out at the first timing, and if a second timing corresponding to the first network speed value of the at least one network speed value is closer to the first timing, a first weight assigned to the first network speed value of the at least one weight is greater.

6. The video processing method of claim 1, wherein acquiring the download link of the first segment comprises:

analyzing a media presentation description (MPD) file associated with the video to acquire time information of the video; and comparing the time information and a second timing of the first segment to acquire the download link of the first segment.

7. The video processing method of claim 6, wherein comparing the time information and the second timing of the first segment comprises:

subtracting a predetermined second from the second timing of the first segment to generate a seek timing; and comparing the time information and the seek timing to acquire the download link of the first segment.

8. A video processing system, comprising:

at least one memory configured to store a source code and a data stream; and at least one processor configured to execute the source code, to:

receive a seek command, and determine whether the data stream comprises first data corresponding to a first segment of a video or not;

if the data stream does not comprise the first data, acquire a download link of the first segment;

execute a weighted average method according to at least one network speed value and at least one weight, to generate a first network speed value corresponding to the first segment, wherein at least one previous segment is downloaded according to the at least one network speed value before the seek command is received;

multiply the first network speed value and a predetermined parameter to generate an estimated network speed value;

select a bit rate according to the estimated network speed value;

download the first data having the bit rate from a server according to the estimated network speed value and the download link, wherein the bit rate of the first data is less than the estimated network speed value, wherein the at least one weight is associated with a first timing when the seek command is sent out; and play the first segment according to the first data, to switch from a current segment of the video to the first segment.

9. The video processing system of claim 8, wherein the predetermined parameter is a positive number less than 1.

10. The video processing system of claim 8, wherein the seek command is sent out at the first timing, and if a second timing corresponding to a first network speed value of the at least one network speed value is closer to the first timing, a first weight assigned to the first network speed value of the at least one weight is greater.

11. The video processing system of claim 8, wherein the at least one processor is configured to compare a second timing of the first segment, a starting time and an ending time of the data stream, and if the second timing exists between the starting time and the ending time, the at least one processor determines that the data stream comprises the first data.

12. The video processing system of claim 8, wherein if the data stream comprises the first data, the at least one processor reads the first data from the data stream to play the first segment.

13. The video processing system of claim 8, wherein the at least one processor is configured to analyze a MPD file associated with the video to acquire time information of the video, and compare the time information and a second timing of the first segment to acquire the download link of the first segment.

14. The video processing system of claim 13, wherein the at least one processor is configured to subtract a predetermined second from the second timing of the first segment to generate a seek timing, and compare the time information and the seek timing to acquire the download link of the first segment.

15. The video processing system of claim 8, wherein the at least one processor is configured to receive the video from the server based on a dynamic adaptive streaming over HyperText Transfer Protocol (DASH).

* * * * *